United States Patent [19]

Farleigh

[11] Patent Number: 5,206,857
[45] Date of Patent: Apr. 27, 1993

[54] APPARATUS AND METHOD FOR TIMING DISTRIBUTION OVER AN ASYNCHRONOUS RING

[75] Inventor: Scott E. Farleigh, Denver, Colo.

[73] Assignee: AT&T Bell Laboratories, Murray Hill, N.J.

[21] Appl. No.: 692,741

[22] Filed: Apr. 29, 1991

[51] Int. Cl.⁵ .................... H04L 12/42; H04L 7/04
[52] U.S. Cl. .................... 370/85.5; 370/85.1; 370/85.15; 370/103; 370/109
[58] Field of Search ............ 370/85.5, 13, 17, 85.15, 370/103, 100.1, 85.1; 375/109

[56] References Cited

U.S. PATENT DOCUMENTS

| | | | |
|---|---|---|---|
| 4,539,679 | 9/1985 | Bux et al. | 370/88 |
| 4,569,042 | 2/1986 | Larson | 370/13 |
| 4,761,799 | 8/1988 | Arragon | 370/103 |
| 4,773,065 | 9/1988 | Kobayashi et al. | 370/85.1 |
| 4,792,966 | 12/1988 | Ballweg | 375/112 |
| 4,807,259 | 2/1989 | Yamanaka et al. | 375/109 |
| 4,815,110 | 3/1989 | Benson et al. | 370/103 |
| 4,845,709 | 7/1989 | Matsumoto et al. | 370/85.5 |
| 4,866,704 | 9/1989 | Bergman | 370/85.4 |

OTHER PUBLICATIONS

FDDI-A Tutorial, Floyd E. Ross, IEEE Communications Magazine May 1986, vol. 24, No. 5.

*Primary Examiner*—Douglas W. Olms
*Assistant Examiner*—Wellington Chin
*Attorney, Agent, or Firm*—Michael A. Morra

[57] ABSTRACT

An asynchronous, fiber optic, ring network includes a number of nodes where data enters and exits the network. Each of these nodes has its own clock to provide timing needed by equipment at that node. So that synchronous data can be transmitted between predetermined nodes, a master node provides timing information which may be used at any node to synchronize its clock. Timing information comprises the propagation delay around the ring (ring latency) as measured by the master node. This measure of propagation delay is transmitted by the master node as an information packet available at all nodes. Synchronization of any other node with the master requires that the other node perform its own measurement of propagation delay, compare its measurement with that of the master node, and make adjustments to its own clock that tend to decrease the difference between these measurements.

13 Claims, 4 Drawing Sheets

APPARATUS AND METHOD FOR TIMING DISTRIBUTION OVER AN ASYNCHRONOUS RING

TECHNICAL FIELD

This invention relates to a communication network having a plurality of nodes, and more particularly to a technique for distributing timing synchronization among selected nodes.

BACKGROUND OF THE INVENTION

Surprisingly, as computers grow in both power and proliferation, so too does their need to borrow and share more data with other computers. This need to exchange greater amounts of information can no longer be fully satisfied by the periodic data transfer between two computers but, rather, requires the simultaneous interconnection among a number of them, each having a particular specialization yet drawing from the specialization of the others. These interconnections are known as networks, and while they are limited in size and found in only corporate environments today, vast global geodesic networks will connect millions of islands of information tomorrow.

Communication systems which allow data transfer over telephone lines at a few hundred bits per second have been an integral part of computer systems for the past few decades. Only recently have networks capable of handling several million bits per second been widely available. Local area networks (LAN) have typically offered between 100 Kb/s and 10 Mb/s among a few hundred stations, and have been limited to a local area (a kilometer or so). One such network, Ethernet, is synchronous and operates at 10 Mb/s. Because rapid information transfer is indispensable in our highly competitive society, Ethernet is being superseded by a higher capacity network knwon as the Fiber Distributed Data Interface (FDDI) which transmits 100 Mb/s of data over each of two counter-rotating rings. FDDI can tolerate a separation of up to 2 kilometers between stations, and support and a total cable distance of 100 kilometers around a ring with 500 station attachments. FDDI possesses enough bandwidth to support up to 800 voice channels or perhaps 1-2 digitized video channels. One problem with voice or video traffic over FDDI, however, is that the network and interface are asynchronous, thereby preventing timing information from passing across the network boundaries. Although FDDI uses a Timed Token Protocol to provide both synchronous and asynchronous service, no technique has emerged as being clearly superior for clock synchronization at various stations around the ring. Whereas packet switching is possible over an asynchronous network, circuit switching requires a synchronous network and for that reason a synchronous FDDI network (FDDI-II) has been proposed. Unfortunately, FDDI and FDDI-II are incompatible, which is to say that a node adapted for FDDI-II operation cannot be part of an FDDI ring.

In an asynchronous system, each link requires its own clock. This means that each link is frequency- and phase-asynchronous vis-a-vis all other links in the ring, and that timing information cannot be recovered from the bit stream. Accordingly, the distribution of synchronous information, such as conventional telephone conversations, on the FDDI system, has certain inherent problems. One well-known solution for transmitting synchronous information over an asynchronous facility is the use of elastic storage registers to buffer the differences in the bit rate. That is, data are written into a shift register at a first bit rate and read out of the shift register at a second bit rate. When packet information is being transmitted, it makes little difference whether the read and write rates are slightly different because packets are generally limited in size and the elastic storage registers can be made as large as desired. However, when transmitting continuous synchronous data, the elastic storage registers will overflow or underflow with the undesirable result that transmitted information will either be lost (overflow condition), or that incorrect information will be created (underflow condition).

U.S. Pat. No. 4,866,704 was issued on Sep. 12, 1989 and discloses a fiber-optic voice/data network. This patent teaches a technique for synchronizing a local clock by monitoring the average fill of an elastic storage register (receiving buffer), speeding up the local clock when the average fill is increasing, and slowing the clock when the average fill is decreasing so that overflow and underflow are prevented. While this technique is useful, it requires that synchronous data be continuously present to maintain synchronization.

It is also known to distribute a reference timing signal over a separate link to each node in a network, including a ring network. However, such a technique requires the installation of a separate network just for timing—thus defeating the structural simplicity of the ring and adding to its cost. It is therefore desirable to improve upon the prior art systems for distributing timing information over an asynchronous ring.

SUMMARY OF THE INVENTION

In accordance with the invention, a ring network includes a master node and one or more slave nodes where data enter and exit the network. Each of these nodes includes a clock for supplying timing information to equipment at that node. The master node measures the time delay encountered by data traversing the network, and transmits this measurement to the slave node. At the slave node, a similar measurement of time delay is made and compared with the measurement transmitted by the master node. Differences between these two measurements are used to adjust the frequency of the clock at the slave node.

In the illustrative embodiment of the invention, clock synchronization is optionally and independently available to any node in the ring network. As a result, the ring network simultaneously supports both synchronous and asynchronous data traffic. Accordingly, the primary reason for developing a synchronous FDDI network (FDDI-II) no longer obtains.

BRIEF DESCRIPTION OF THE DRAWING

The features and capabilities of the present invention will be more fully understood when reference is made to the detailed description and the drawing, of which

DETAILED DESCRIPTION

An emerging standard (ANSI X3T9.5)—better known as the Fiber Distributed Data Interface (FDDI-)—defines a 100 Mb/s, time-token protocol. This protocol is to be implemented on an asynchronous, fiberoptic network optimized for 1300 nanometer technology. Fiber-optic communication is best suited for point-to-point transmission and is present in two local area network (LAN) topologies, the active hub star, and the ring. Active stars require extensive connections to wherever the central hub is located and introduce a single failure point that can disable the entire LAN. Single-ring networks are like chains which are vulnerable to failures at any station. FDDI minimizes this by using dual, counter-rotating rings. This provides an alternate path if a station or a link fails, allowing data to be wrapped back onto the secondary ring in the event of failure. The secondary ring may be only a standby ring, or it may be used for concurrent transmission thereby providing a 200 Mb/s network. Additional background information regarding FDDI is contained in an article by Floyd E. Ross entitled: *FDDI—a Tutorial*, published in the IEEE Communications Magazine, May 1986-Vol. No. 24, No. 5 at pp. 10-17.

Figure 1:
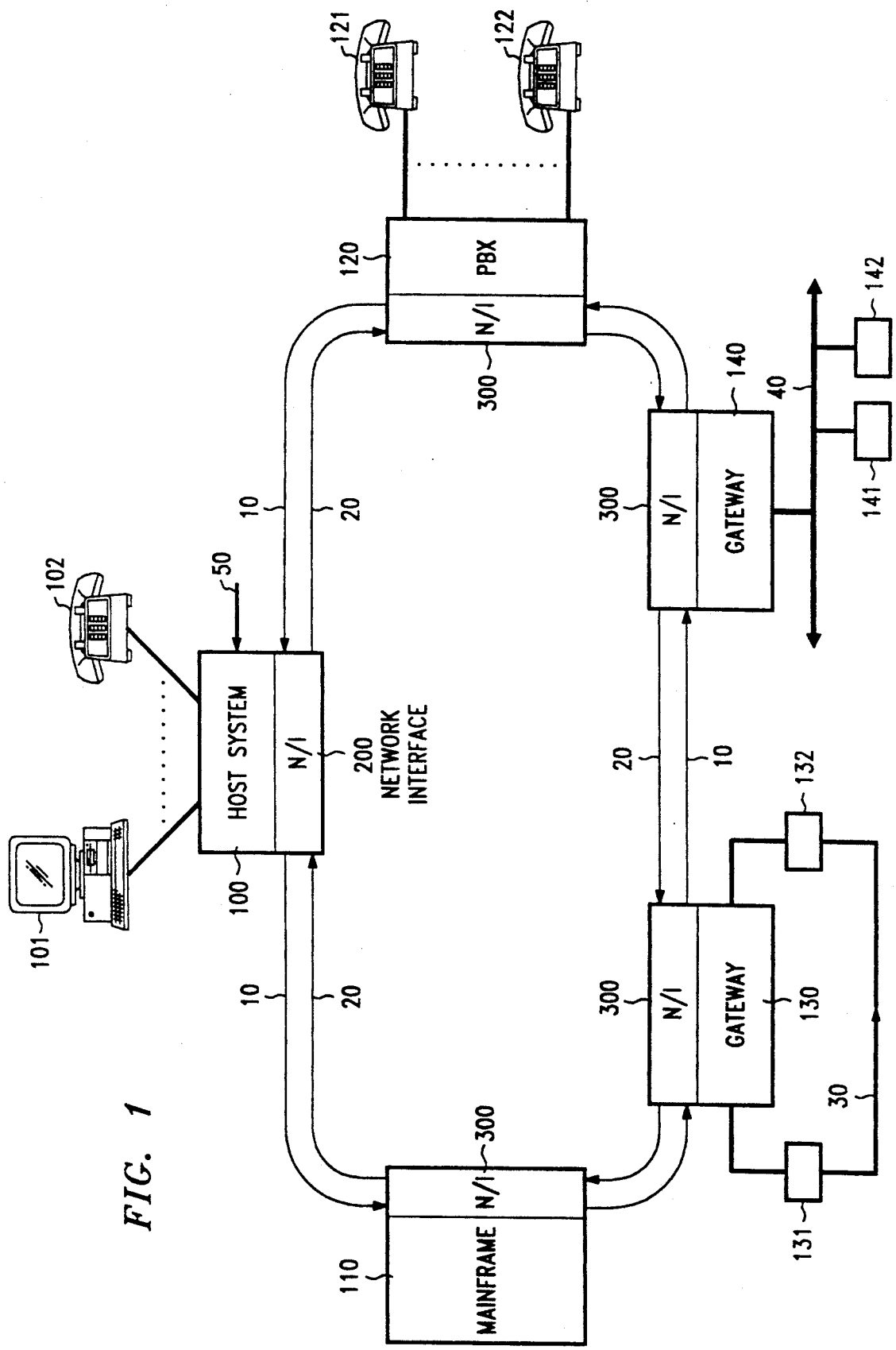
FIG. 1 illustrates a ring network having counter-rotating rings and a plurality of nodes, each serving different host system equipment.

Referring now to FIG. 1, there is disclosed an example of an FDDI network comprising primary ring 10 and counter-rotating secondary ring 20. Nodes are illustratively positioned at locations around the network that may be separated by large distances. Associated with each node is a host system that is available to users at all other nodes via the fiber-optic ring. Together they form a network whose combined resources are formidable and diverse. A generalized host system 100 is shown connecting stations 101, 102 to the FDDI network via network interface (N/I) 200. In the discussion that follows, network interface 200 and host system 100 are designated as the "master node". In the present invention, the master node distributes timing information to all of the other nodes. Accordingly, network interface 200 is similar to the other network interfaces 300 in all respects except that it supplies timing information to them. Network interface 200 receives a timing signal over line 50 via host system 100. Any pair of nodes desiring to exchange synchronous data with each other need to synchronize their clocks. This can be accomplished by adjusting the clock frequency at one of the nodes to agree with the other, or by adjusting the clock frequency of both of the nodes to agree with a reference clock. Once synchronization is achieved, information such as digitized voice can be transmitted and received by appropriate equipment at these nodes.

Host system 100 can be any mainframe, workstation, minicomputer or peripheral to which a network interface is attached. Its role is to provide and receive network data and perform some higher-level protocol functions which are not handled by the associated stations. Examples of other host systems include, but are not limited to, mainframe 110, PBX 120, and gateways, 130, 140.

Stations 131, 132 are shown connected to gateway 130 by, for example, a network 30 (e.g., IEEE-802.5 token ring). Stations 141, 142 are shown connected to gateway 140 by, for example, a bus 40 (e.g., IEEE-802.3 Ethernet or IEEE-802.4 token bus). Stations 121, 122 are shown connected to PBX 120. Each of these nodes connects to the fiber-optic ring by a network interface (N/I) 300 whose operation is defined in detail by FDDI standards, but will be briefly discussed hereinafter.

Figure 2:
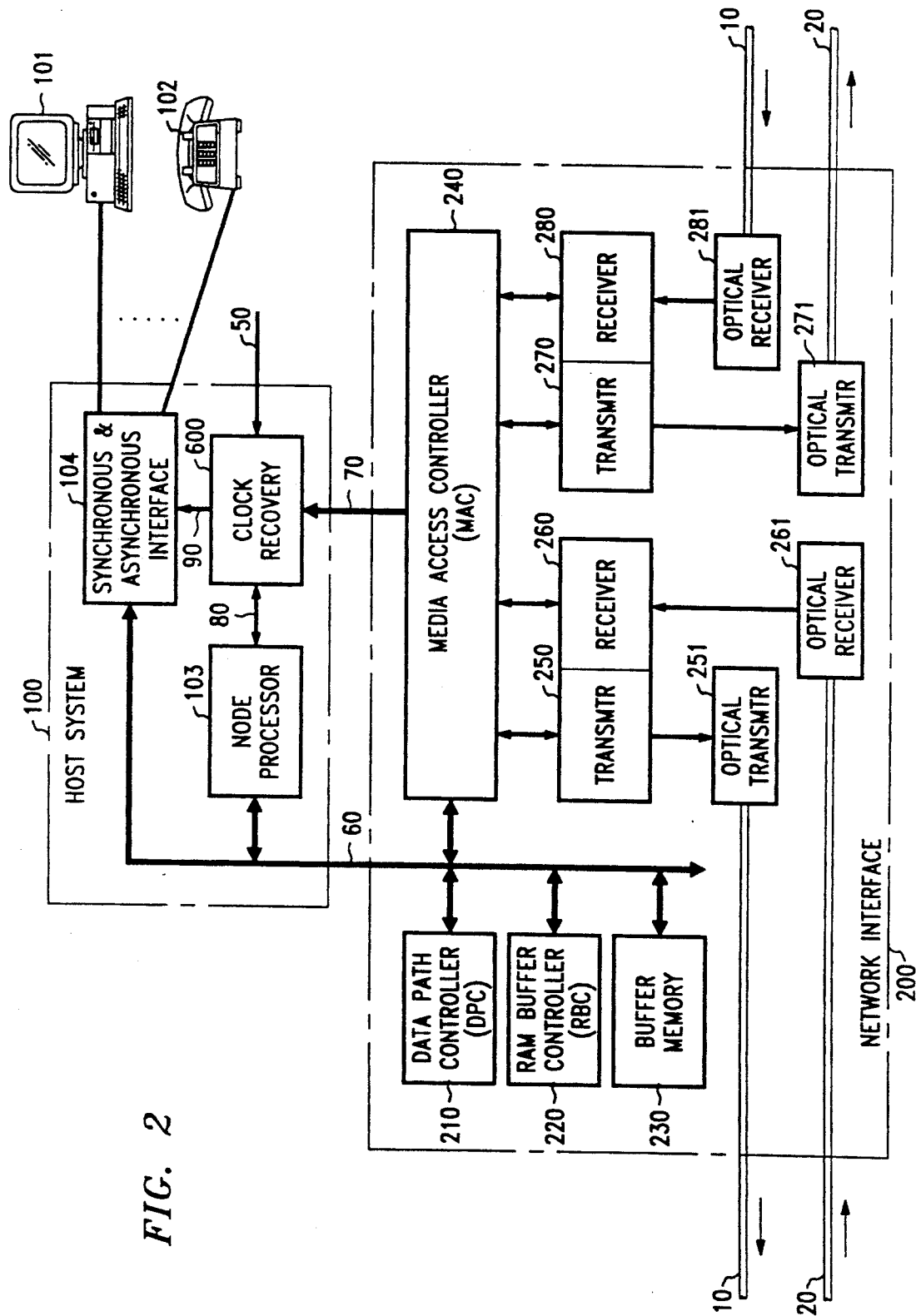
FIG. 2 discloses equipment used at a particular node in accordance with the invention.

FIG. 2 discloses the equipment needed at each node to support interconnection with the FDDI network. Optical fibers 10, 20 are made from glass-clad silica and consist of an inner core surrounded by a glass cladding (having a different refractive index than the silica) and a protective sleeve. Plastic cladding is not used in FDDI applications because of its greater attenuation. Optical receivers 261, 281 receive modulated light-wave signals, whose center wavelength lies between 1270 and 1380 nanometers, from optical fibers 20, 10 respectively, and consist of a photodetector, an amplifier, a shaping filter, a comparator, a buffer to provide suitable electrical levels, and a signal detect circuit. The photodetector is constructed from an InGaAs/InP PIN photodiode that senses light intensity and converts it into current pulses. Optical transmitters 251, 271 transmit modulated light-wave signals, whose wavelengths are also in the 1300 nanometer range, to optical fibers 10, 20 respectively. Each optical transmitter consists of a driver and a light emitting diode (LED). The LED is typically made of InGaAsP, and generates light whose intensity is a function of the input data to be transmitted.

Transmitter/receiver pair 250, 260 controls the encoding and decoding of data and control symbols, serializing the data clock recovery, line-state detection and reporting. In operation, transmitter 250 serializes eight-bit-wide parallel data from Media Access Controller (MAC) 240 to produce non-return-to-zero (NRZ) code. 4B/5B coding is used which comprises translation of 4-bit groups of data into a 5-bit value, and conversion into the NRZ format for transmission on the fiber-optic ring. 4B/5B encoding is said to be 80% efficient since a 100 Mb/s data rate translates into a 125 megabaud rate which is present on the fiber-optic ring. Receiver 260 decodes the data received from the fiber-optic ring and converts it into symbols that can be recognized by the MAC. Tasks of receiver 260 include retiming the data to an internal clock via a phase-locked loop and an elastic buffer, and converting 5-bit code back into 4-bit code. Differential Manchester coding is frequency compared with 4B/5B coding and has the advantage of being rich in clock information with a transition at every bit, but the disadvantage of being only 50% efficient. Suitable devices for the transmitter and receiver are the AM7985 and AM7984, respectively, which are commercially available from Advanced Micro Devices, Inc. Transmitter 270 and receiver 280 are identical to transmitter 250 and receiver 260, but are dedicated to different optical fibers.

Bus 60 comprises several buses. It includes, for example, a 32-bit bus used to interconnect buffer memory 230 with other devices, while several 16-bit buses are used between controllers 210, 220 and 240 and node processor 103.

Data Path Controller (DPC) 210 converts data in received packets from byte-wide to 32-bit parallel word formats, performs parity checks and generates packet and node status. A suitable device for the DPC is the AM79C82.

RAM Buffer Controller (RBC) 220 generates addresses to buffer memory 230 for received and transmitted packets. The RBC handles buffer management and arbitrates direct memory access coming from DPC 210, node processor 103 and other host system apparatus. A suitable device for the RBC is the AM79C81.

Buffer memory 230 is a conventional 256-kbyte static random access memory which is readily available from a number of commercial sources. The buffer memory is a storage area accessible by the controllers 210, 220, 240, the node processor 103 and other host system equipment.

Media Access Controller (MAC) 240 controls the right to transmit data to the network based on capturing a token according to a set of network rules, recognizes addresses, controls ring recovery, and handles network and frame status. A suitable device for the MAC is the AM79C83. The above devices designated 210, 220, 240, 250, 260 are all commercially available from Advanced Micro Devices, Inc. in what is known as the SUPERNET TM chip set which has been designed to conform to the FDDI standard.

Node processor 103 is a separate microprogrammed or conventional microprocessor-based system used for offloading the host and overseeing the operation of the network interface 200. The node processor communicates with the network interface over bus 60. A suitable device is the AM29000 RISC Processor, also commercially available from Advanced Micro Devices, Inc., which includes a number of embedded counters. One of these counters is used as counter 660 in FIG. 6, and is shown functionally separated from the node processor for greater clarity in explaining the invention.

Block 104 (Synchronous and Asynchronous Interface) contains the circuitry needed to buffer information between memory 230 and a synchronous Time Division Multiplexed (TDM) bus. Here, terminal 101 and telephone 102 represent the kinds of devices that might be connected to such a bus. Block 104 uses Direct Memory Accessing to move data between memory 230 and another buffer memory within block 104. In addition, block 104 contains the circuitry needed to move data to and from bus 60 and the TDM bus. A source of synchronous timing is provided to block 104 over line 90. Since the present invention is concerned with establishing timing, such as present on line 90, rather than its use, further details regarding block 104 are omitted for clarity.

FDDI Protocol

Information is transmitted on the FDDI ring as packets of data, each having a maximum size of 9000 symbols (4 bits/symbol) and only one node may transmit a data packet at a time. However, in order to avoid anarchy, a single token is passed from node to node giving the token holder an exclusive right to transmit data. FDDI protocol promotes fair an deterministic access to network resources for all stations. This is done using a timer that measures the time between token arrivals, a timer that controls how long a token can be held for transmission, and a counter that indicates the number of times the token arrives later than expected. The rules for data transmission on FDDI depend upon the type of data to be sent. For transmission of synchronous data, the rules are straightforward. The amount of synchronous data that can be transmitted at a given token opportunity is limited by the bandwidth-allocation process which assures that if every station transmits its maximum allotment of synchronous data, the negotiated target token-rotation time (TTRT) will not be exceeded. The transmission of asynchronous data is slightly more complicated, since the maximum time allotted for transmission is not constant. Instead, a station can transmit asynchronous data until the unused bandwidth on the ring is exhausted.

Figure 3:
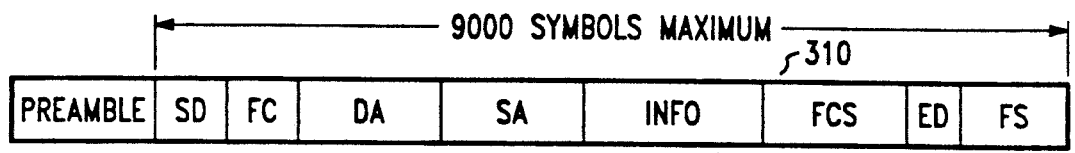
FIG. 3 shows a data packet such as used in the Fiber Distributed Data Interface (FDDI)
Figure 4:
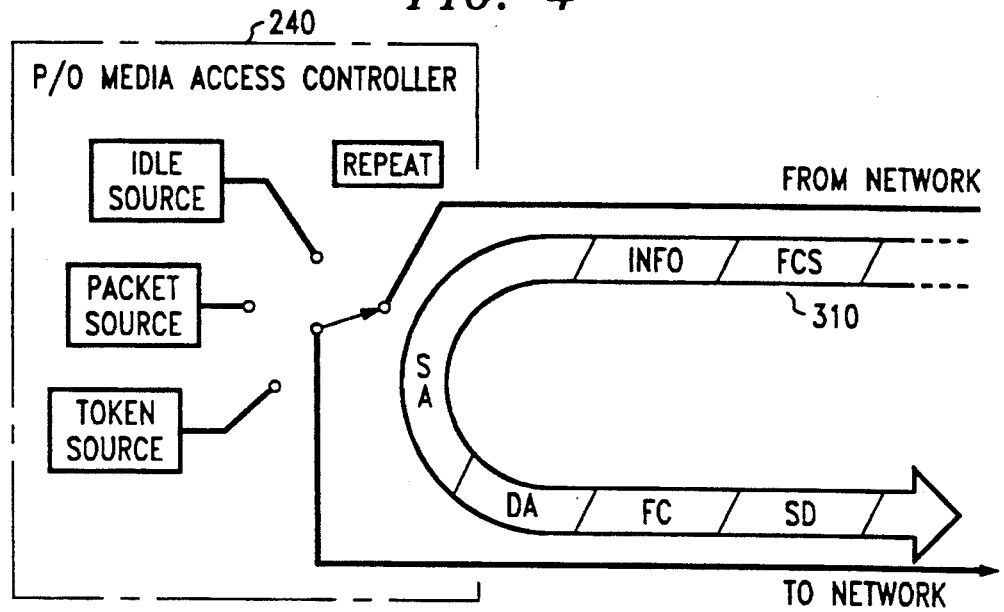
FIG. 4 illustrates the operation of a Media Access Controller at a node when repeating a data packet to the network.
Figure 5:
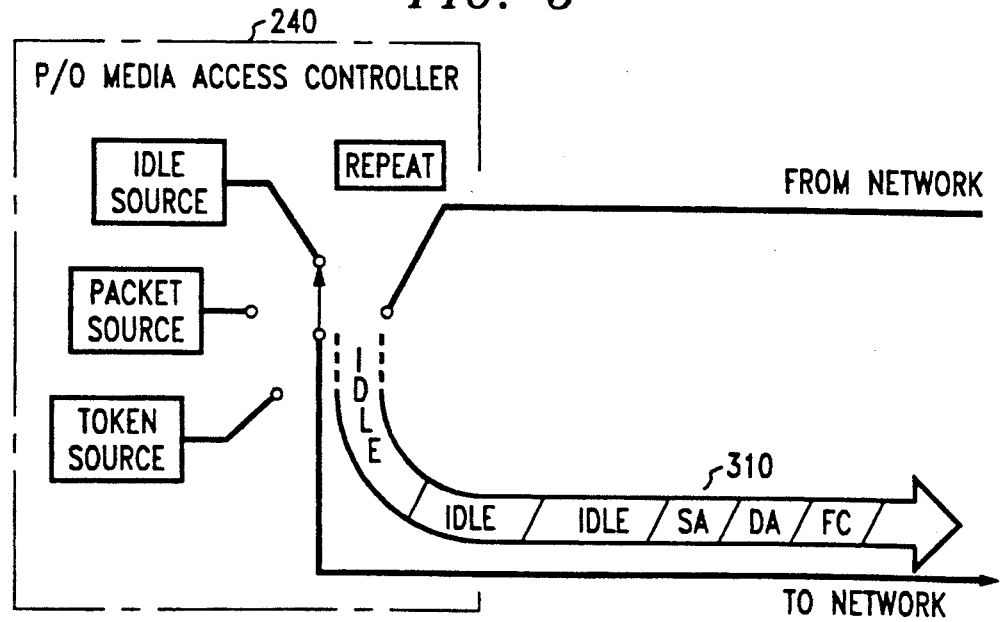
FIG. 5 illustrates the operation of the Media Access Controller at a node when supplying an idle data packet to the network.

MAC 240 controls the flow of data transmission on the ring, and indicates when a data packet is transmitted as well as when it has returned from a trip around the network. This feature is highly important in the practice of the invention as will be pointed out later. FIG. 3 discloses the format of an FDDI packet 310. Packets are preceded by a PREAMBLE having a minimum of 16 "idle" control symbols. Packets begin with a Start Delimiter (SD) composed from the J and K control symbols of the 4B/5B code. This is followed by a 2-data-symbol Frame Control (FC) field that identifies the type of packet. The Destination Address (DA) identifies the intended recipient of the packet. Likewise, the Source Address (SA) identifies the packet's sender. Addresses can be either 26 or 48 bits in length. The DA field can point to a single station, a group of stations, or all stations on the ring. Following SA comes the variable length information field (INFO). A frame Check Sequence (FCS) field contains 4 bytes of data that are the result of a 32-bit Autodin II cyclic redundancy check polynomial. The FCS ensures the data integrity of the FC, DA, SA, INFO, and FCS fields. Following the FCS field, an End Delimiter (ED) formed with the "T" symbol is transmitted. The Frame status (FS) field is used for symbols that determine whether the packet was received with error, if the address was recognized, or whether the packet was copied. The maximum length of the packet (here 9000 symbols) is limited by the length of the elastic buffer and the worst-case frequency difference between the clocks at two nodes Referring now to FIG. 4, it will be seen that MAC 240 acts like a switch. Normally the switch selects a source of IDLE control symbols for transmission on the ring. When the Start Delimiter arrives, MAC 240 switches to a repeat path. The packet is monitored, copied if required, and simultaneously repeated. MAC 240 can also switch to source its own packets or issue a token. Packets are removed from the ring by the originating station. This process, called "stripping", is illustrated in FIG. 5. The MAC repeats the packet until the SA field is received. Upon recognition of the Source Address, the switch moves to the IDLE position. The resulting packet fragment on the ring is ignored and eventually removed when it reaches a station holding the token for transmission. A station wishing to transmit must first "capture" a token. The token is a 6-symbol packet that is uniquely recognized. A station captures the token by performing the stripping action. Only the token SD field is repeated on the ring. Once the token is captured, the station can begin transmitting packets. When the last packet is sent, the station immediately follows by issuing a new token.

It is noted that FDDI is asynchronous, which means that the clock at each of the various nodes is not synchronized with a common oscillator. Such synchronization frequently comes at a very high price. It is important, however, that each of the nodes be equipped to receive and transmit data at an agreed-upon rate, and that data formats be established for efficient communication. FDDI employs an interesting solution to the ring clocking problem. The total ring, including all of its stations and all of its links, must continue to have the same apparent bit length during data transmission. Otherwise, some bits would be lost or gained as a frame was repeated around the ring. In the face of jitter, voltage, temperature, and aging effects, such stability can only be realized through special provisions. At each node, an elastic buffer is inserted between the receiver, which employs a variable frequency clock to track the clock of the previous transmitting station, and a transmitter, which runs on a fixed-frequency clock. The elastic buffer at each station, is re-initialized during a preamble which precedes each frame or token. This has the effect of increasing, or decreasing, the length of the preamble which is initially transmitted as 16 or more symbols. The transmitter clocks typically have 0.005% stability and the elastic buffer stores 10 bits of data. Accordingly, while significant data can be transmitted without exceeding the limits of the elastic buffer, practical trade-offs are made between the accuracy of the clock and the length of the buffer.

Figure 6:
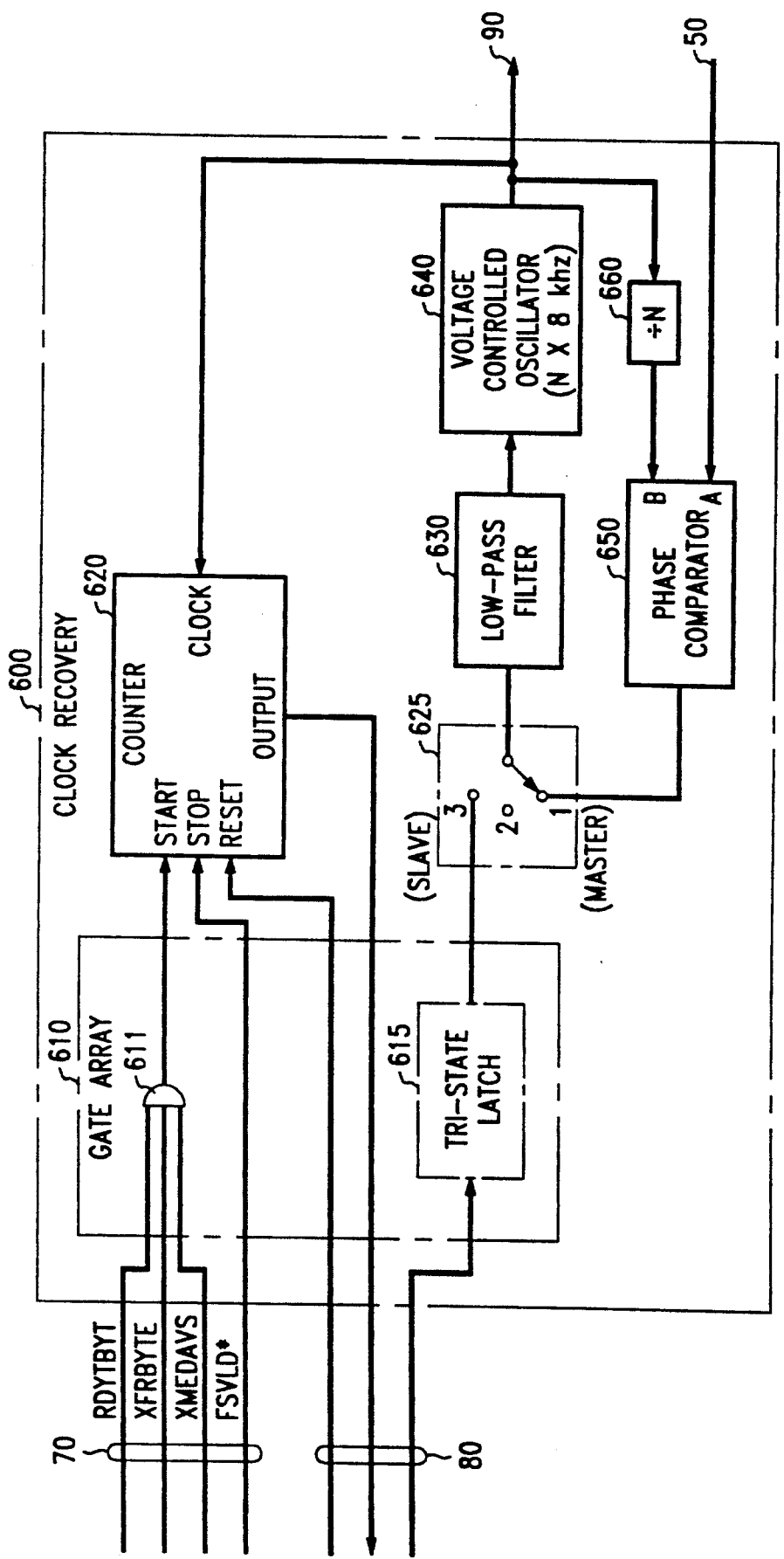
FIG. 6 discloses, in block form, the details of clock recovery in accordance with the invention.

FIG. 6 discloses detail regarding the construction of clock recovery circuit 600 which is used at both master and slave nodes to provide a source of timing on line 90 to all equipment at the node which it serves. Switch 625 is used for selecting between operation as a master timing source (position 1), a free-running timing source (position 2), or a slave timing source (position 3). Because digital voice communication equipment at telephone offices typically use 8 kHz as the sampling frequency when carrying out analog-to-digital conversion, 8 kHz is the information rate for synchronous communications. Accordingly, voltage-controlled crystal oscillator (VCO) 640 operates at a multiple (N) of the 8 kHz base frequency so that it can be easily synchronized therewith. In an illustrative embodiment, VCO 640 operates at 8.192 MHz, and N=1024. Synchronization is not required at any node which operates asynchronously, although synchronization requires very little in the way of additional components. For example, in the preferred embodiment of the invention counter 620 is actually part of node processor 103 (see FIG. 2), and gate array 610 only adds a few gates to a larger gate array (not shown) used for performing a number of other tasks within the host system. In the Free-Run Mode, (position 2 of switch 625) VCO 640 provides an 8.192 MHz crystal-controlled timing signal to all using equipment. VCOs are well-known devices that are available from a number of vendors including CTS Corporation and SaRonix.

Synchronizing VCO 640 to an 8 kHz signal, such as provided by a telephone office, is accomplished when switch 625 is in position 1 where operation as the master source of timing for the ring network is desired. Divide-by-N counter 660 functions to divide the 8.192 MHz signal by 1024 to provide an 8 kHz square wave whose phase is compared with the phase of a reference 8 kHz signal on input line 50. Phase comparator 650 is a conventional phase-locked-loop, such as the 74HC4046M, which is a commercially available device from a number of vendors including Signetics and National Semiconductor Corporation. The output of the phase comparator is a measure of the error in the frequency of the VCO. This error signal comprises a binary signal whose logic levels are used to increase/decrease the frequency of VCO 640. Alternatively, a phase comparator having output states other binary voltages may be advantageously used in the present invention. Indeed, the following paragraph discloses a Tri-State Latch 615 that provides an output state that neither increases nor decreases the frequency of the VCO. When the "A" and "B" inputs to the phase comparator are identical, the VCO is at the desired frequency, although the output signal alternates between the two logic levels. Low-Pass filter 630 is used to smooth such time-varying signals at the input to VCO 640 so that an averaged voltage is presented to the VCO.

Synchronizing VCO 640 to timing information supplied by a remote source of timing is accomplished when switch 625 is in position 3 where operation as a slave node is desired. The fundamental principle adapted for use in the present invention is simply stated: independent observes measuring the identical phenomenon should reach an identical result. If not, then the measuring apparatus is modified until the results are identical. In the present invention, the phenomenon to be measured is the time delay that a data signal encounters during a single trip around the ring network. Since the ring network is identical for all observers, then they should all measure identical time delays—but they do not. And the reason that they do not is because the clocks that are used to make the measurements are different. The present invention designates one observer (master node) to make the "official" measurement of time delay around the ring (ring latency), and to communicate this measurement to all nodes. Any node seeking to become synchronous with the master node makes its own measurement of ring latency, compares it with the "official" measurement made by the master node, and adjusts its clock so that its measurement of ring latency is identical with that of the master.

Returning now to FIG. 6, adjustments to VCO 640 are made based on differences in ring latency measurements. At this time, switch 625 is in position 3 (Slave Mode). AND gate 611 responds to three input signals from line 70 to provide a start pulse for counter 620. When a synchronous data packet leaves Media Access Controller 240 (see FIG. 2), all three inputs to AND gate 611 are high causing its output to also become high. Using the illustrative AM79C83 device, these leads are designated RDYTBYT, XFRBYTE and XMEDAVS. It is noted that this synchronous packet is generated by the node, and not a repeated synchronous packet!

Another signal lines FSVLD*, also from MAC 240, signals when the node has received its own packet—which is to say that the transmitted packet has traversed the entire ring and needs to be stripped from the ring. This signal (FSVLD*) is used to stop counter 620 so that the number which is present at the output of the counter is the number of cycles of the 8.192 MHz clock that have occurred between the start and stop pulses and is a measure of ring latency delivered to node processor 103 (see FIG. 2) which appends this number to the end of the next synchronous packet that is to be sent around the ring. This is done regardless of whether the node is the master or a slave. If the node is the master, the process is ended. If the node is a slave, the node processor compares the value that is read from counter 620 to the value that the master node transmitted on its last synchronous packet. These values are subtracted from each other in the node processor and the results of the subtraction are delivered to latch 615. In the preferred embodiment of the invention, latch 615 provides three output states comprising +5 volts, ground, or an open circuit. These states are used to either increase, decrease, or not affect the frequency of the voltage-controlled crystal oscillator 640.

Although a particular embodiment has been shown and described, it is understood that various modifications are possible within the spirit and scope of the invention. These modifications are possible within the spirit and scope of the invention. These modifications include, but are not limited to, use of the invention on non fiber-optic networks, ring latency measurements in which the data packet makes more than a single excursion around the ring, use of the invention in a network where packets, per-se, are not used, and use of the invention in configurations where node connections are parallel rather than serial. Furthermore, it is understood that in a network of counter-rotating rings, either ring may be used for ring latency measurements and either ring may be used to transmit the results of such measurements. While it is preferred that the master and the slave nodes each use the same ring to make latency measurements, it is not required.

I claim:

1. A communication network interconnecting a master node and at least one slave node in a ring topology, each node including a clock for providing timing signals to equipment at that node, each node further including means for transmitting and receiving data to and from the ring network, characterized in that:

the master node includes:

means responsive to the clock at the master node for measuring a first time delay encountered by data traversing the ring network;

means for transmitting the measure of the first time delay to the slave node, the slave node includes:

means responsive to the clock at the slave node for measuring a second time delay encountered by data traversing the ring network;

means for receiving the measure of the first time delay from the master node; and means responsive to the difference between the measured first and second time delays for adjusting the frequency of the clock at the slave node to bring its frequency into a predetermined relationship with the frequency of the clock at the master node.

2. The invention of claim 1 wherein the measure of the first time delay is transmitted to the slave node over the ring network.

3. The invention of claim 1 wherein time is measured by counting the number of clock cycles that occur between the time when a data packet enters the ring network and the time when that packet exits the network, said data packet being transmitted and received by node performing the measurement.

4. The invention of claim 1 wherein the predetermined relationship between the frequency of the clock at the slave node and the frequency of the clock at the master node is equality.

5. The invention of claim 1 wherein the communication network comprises fiber-optic links between the nodes.

6. The invention of claim 5 wherein the communication network conforms to the Fiber Distributed Data Interface protocol.

7. A local area network, configured as a token-passing ring, for communicating packets of information between nodes attached to the ring, at least one of the nodes being designated slave for the purpose of receiving information regarding the frequency of the clock at the master node, the slave node characterized by:

means for transmitting an identifiable packet onto the ring;

means for receiving said identifiable packet after it has traversed the ring;

means responsive to a clock at the slave node for measuring the time interval between the event that the identifiable packet is transmitted and the event that it is received in order to measure ring latency;

means for receiving a measurement of ring latency made at the master node;

means jointly responsive to the ring latency measurement made at the master node and to the ring latency measurement made at the slave node for modifying the frequency of the clock at the slave node in a manner that decreases the difference between the latency measurements.

8. A method for timing synchronization in an asynchronous ring network that interconnects first and second stations; each station having a timing signal generator, a transmitter for entering data onto the network, and a receiver for receiving data from the network, the ring network circulating data around the ring in a time interval known as "ring latency", the method comprising the steps of:

measuring ring latency at the first station;

transmitting the measure if ring latency to the second station;

measuring ring latency at the second station;

calculating an error signal, at the second station, as the difference between measurements of ring latency made by said first and second stations; and modifying the frequency of the timing signal generator, at the second station, in a manner that decreases the magnitude of the error signal.

9. The method of claim 8 wherein the step of measuring ring latency at a station comprises the following steps:

transmitting a data packet onto the ring network;

identifying the return of the data packet from the ring network; and measuring the time interval between steps of transmitting and receiving said data packet.

10. The method of claim 9 wherein the station includes a counter that counts pulses from the timing signal generator, and wherein the time interval measurement comprises the following steps:

resetting the counter prior to the time interval measurement;

starting the counter when the data packet is transmitted; and stopping the counter when the data packet is received.

11. A method for establishing frequency synchronization between clocks at two different geographic locations, each location having access to a common transmission media, and each location having apparatus, including its clock, for independently measuring signal propagation delay over the transmission media, the method including the steps of:

measuring the propagation delay over said transmission media at each location:

communicating the measurement of the propagation delay made at one location to the other location; and changing the frequency of the clock at said other location in accordance with the difference between the measurements of propagation delay made at each location.

12. The method of claim 11 wherein the common transmission media comprises communication links interconnecting a plurality of nodes in a ring network, and wherein said two different locations correspond to two of the nodes.

13. The method of claim 11 wherein the common transmission media comprises fiber-optic cables interconnecting said locations in a ring topology.

* * * * *